(12) United States Patent
Sánchez Herrero et al.

(10) Patent No.: US 6,889,328 B1
(45) Date of Patent: May 3, 2005

(54) METHOD AND APPARATUS FOR SECURE COMMUNICATION

(75) Inventors: Juan Antonio Sánchez Herrero, Madrid (ES); Odelin Calatrava Requena, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/569,768

(22) Filed: May 12, 2000

Related U.S. Application Data
(60) Provisional application No. 60/136,444, filed on May 28, 1999.

(51) Int. Cl.⁷ .............................................. G06F 17/00
(52) U.S. Cl. ..................... 713/200; 713/151; 713/152
(58) Field of Search ............................. 713/200–202, 713/150–159, 160–163, 168–170, 182, 189–190

(56) References Cited

U.S. PATENT DOCUMENTS

| | | | |
|---|---|---|---|
| 4,555,805 A | | 11/1985 | Talbot |
| 4,920,567 A | | 4/1990 | Malek |
| 6,678,822 B1 | * | 1/2004 | Morar et al. ................. 713/182 |
| 6,697,942 B1 | * | 2/2004 | L'Heureux et al. .......... 713/152 |
| 6,701,441 B1 | * | 3/2004 | Balasubramaniam et al. .... 713/201 |
| 6,715,081 B1 | * | 3/2004 | Attwood et al. ............. 713/201 |
| 6,738,912 B2 | * | 5/2004 | Buttiker ....................... 713/201 |
| 6,754,832 B1 | * | 6/2004 | Godwin et al. ............. 713/201 |

FOREIGN PATENT DOCUMENTS

| | | |
|---|---|---|
| GB | 2324682 | 10/1998 |
| JP | 8297638 | 11/1996 |

OTHER PUBLICATIONS

GSM security: a description of the reasons for security and the techniques☐☐Brookson, C.;☐☐Security and Cryptography Applications to Radio Systems, IEE Colloquium on, 1994 ☐☐pp.:2/1–2/4.*

GSM mobile phone based automobile security system☐☐Moon, Y.S.; Wong, K.; Ho, K.S.;☐☐Electronics Letters, vol.: 36, Issue: 5, Mar. 2, 2000 ☐☐pp.:463–464.*

Mobility and security management in the GSM system and some proposed future improvements☐☐Mehrotra, A.; Golding, L.S.;☐☐Proceedings of the IEEE, vol.: 86, Issue: 7, Jul. 1998 ☐☐pp.:1480–1497.*

Mobile Application Part (MAP) Specification, TS GSM 09.02 v.5.6.00.

* cited by examiner

Primary Examiner—David Jung (57) ABSTRACT

Secure communication is provided for entities in one or more networks. It is determined whether security measures needed for the communication exist between the entities. If such measures do not exist, the security measures are established, and the communication is initiated. The security measures include security bindings including information needed for the secure communication. Security measures are established between entities in one or more networks based on predetermined security requirements and on a determined needed security level. The security level needed may be determined based on whether the entities are in the same network or in different networks and/or on the information being transmitted. Security bindings are established between the entities depending on the information to be transmitted and/or the network to which the entities belong. The security bindings include information identifying the security binding, encryption information, authentication information, integrity information, a list of addressees or group of addressees included in the security bindings, and/or information regarding the lifetime of the security bindings. The encryption, authentication, and integrity may be specified at a parameter level.

26 Claims, 8 Drawing Sheets

METHOD AND APPARATUS FOR SECURE COMMUNICATION

This application claims priority under 35 U.S.C. §§ 119 and/or 365 to Ser. No. 60/136,444 filed in The United States of America on May 28, 1999; the entire content of which is hereby incorporated by reference.

BACKGROUND

This invention relates generally to a method and apparatus for secure communication. More specifically, this invention relates to a method and apparatus for secure communication between entities in the same or in different communication networks.

There are many types of public land mobile networks, e.g., a Global System for Mobile Communications (GSM), a Digital Cellular System for Mobile Communications (DCS 1800), a Personal Communication System (PCS), and a Universal Mobile Telecommunication System (UMTS). These networks provide a wide range of services and facilities to mobile subscribers that are roaming around between individual cells of the mobile radio communication networks. An exemplary network architecture for mobile radio communication systems such as those is shown in FIG. 1.

A typical network includes at least one Home Location Register (HLR) 100 for storing information about subscribers to the network, a Visitor Location Register (VLR) 110 for storing information about subscribers to other networks that may be roaming in the network, a Mobile Services Switching Center (MSC) 120 for performing switching functions for the mobile stations, a Gateway MSC (GMSC) 130 for routing incoming calls to the PLMN to the appropriate MSC, and an SMS Gateway MSC (SMSGMSC) 140 which is an interface between the mobile network and a network providing access to the short message service center for delivery of short messages to the mobile stations via a Switching Center (SC) 150. A Base Station Controller (BSC) 160 and a Base Transceiver Station (BTS) 170 are part of the base station system equipment for connecting the network to a mobile station 180. An Equipment Identity Register (EIR) 190 handles management of the equipment identities of the mobile stations.

Figure 1:
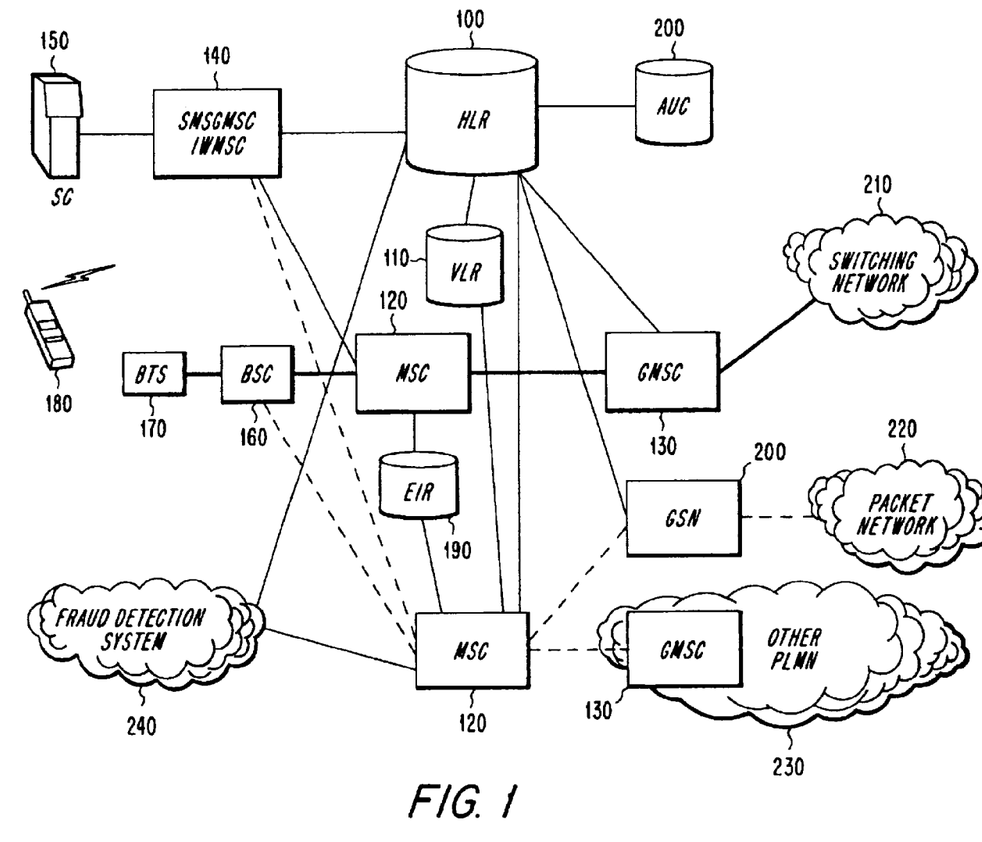
FIG. 1 illustrates an exemplary network architecture for mobile radio communication systems.

As shown in FIG. 1, other entities may be connected to the network. For example, a Switching Network 210 may be connected to the network via the GMSC 130, a Packet Network 220 may be connected to the network via a General Packet Radio Service Support Node (GSN) 200, and another PLMN 230 may be connected to another GMSC 130. A Fraud Detection System (FDS) 240 may be connected to several types of entities in the network, e.g., the HLR 100 and another MSC 120, from which it obtains information for specific subscribers. The information collected may include information regarding the charging data records generated, e.g., at the MSCs, the location information of the subscribers, which is generally generated at the HLR, and information regarding the activity generated in real time (such as the number of call forwarding registrations performed in a period of time, the number of parallel calls made in that time, etc.). The FDS 240 discovers possible fraud risk situations. For example, the FDS 240 detects when a subscriber suddenly has a really high charging record that has previously never occurred. As another example, the FDS 240 detects when a subscriber generates several parallel calls to certain countries, which might indicate call selling activities. As a third example, the FDS 240 detects when a subscriber is located in two different distant places within a very short interval of time, which may indicate cloning activities.

The entities of the PLMN communicate via a common signalling system. For example, in the GSM System, the Mobile Application Part (MAP) of the Signaling System No. 7 specified by CCITT is used to communicate between entities in the PLMN. Details of this signalling system are given in Digital Cellular Telecommunications System (Phase 2+), Mobile Application Part (MAP) specification, TS GSM 09.02 v. 5.6.00, which is incorporated herein by reference.

Figure 2:
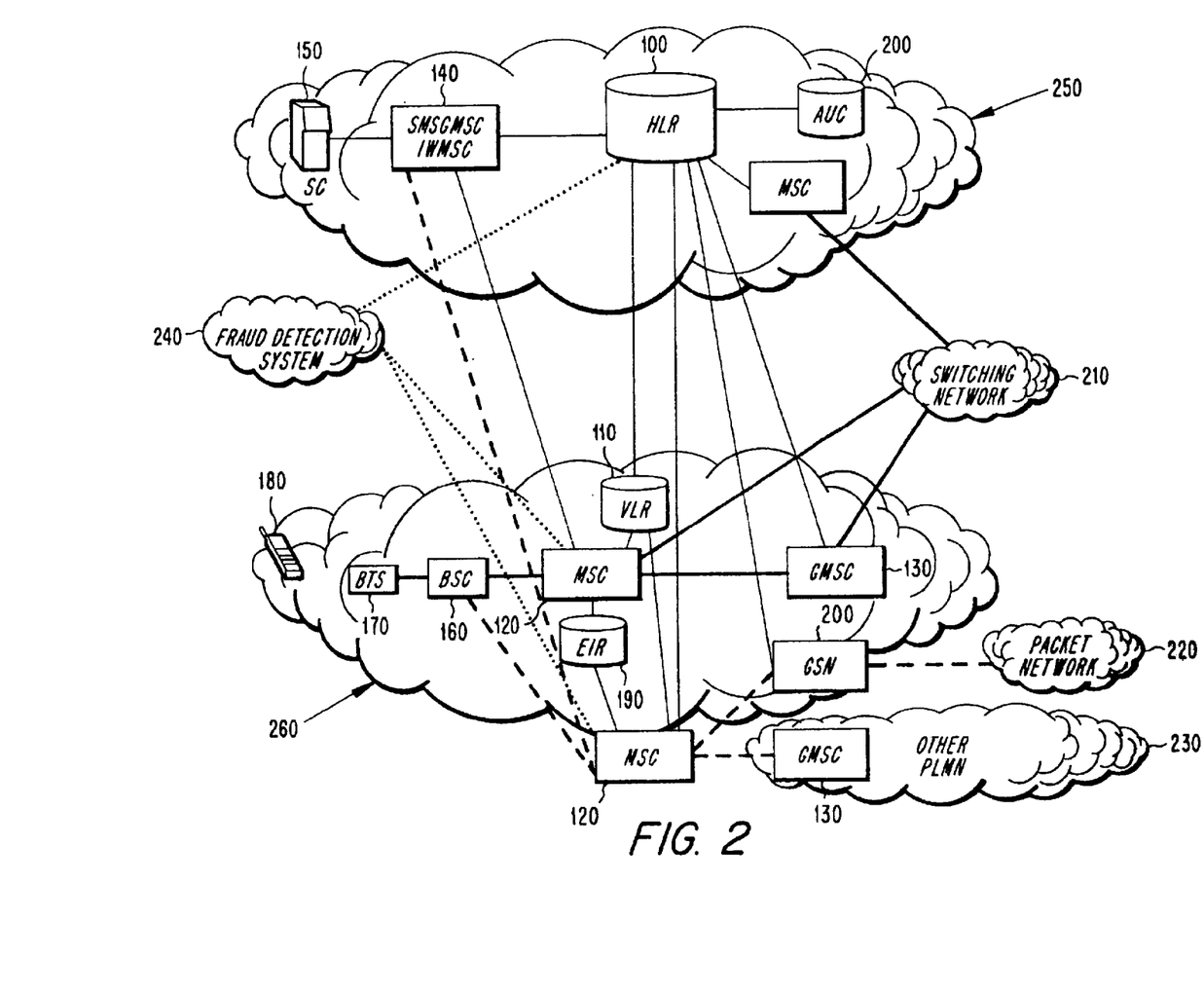
FIG. 2 illustrates an exemplary network architecture for a roaming scenario.

Based on roaming agreements between mobile network operators, the mobile subscribers belonging to a specific PLMN 250, referred to as a Home PLMN (HPLMN), can make use of their services and facilities while roaming in another PLMN network 260, referred as a Visitor PLMN (VPLMN). FIG. 2 shows an exemplary configuration of a network architecture for a roaming scenario. Similar to FIG. 1, a FDS 240 is connected to entities such as the HLR 100 and the MSCs 120.

With the continues growth of network elements, transmission media, etc., more refined fraud methods have been developed. Such methods involve attacks on the signalling system. Using GSM as an example, the security of the global SS7 network as a transport system for sensitive signalling messages is open to major compromise. Messages can be eavesdropped, altered, injected or deleted in an uncontrolled medium confidential information has recently been added in the GSM standards to the signalling protocols which will increase the confidentiality risk due to the lack of confidentiality in the signalling media. Such confidential information includes, e.g., location information based on geographical coordinates, charging information, etc. These risks will further be increased by the possible future use of open signalling protocols for signalling transmission, e.g., Transmission Control Protocol/Internet Protocol (TCP/IP). While the current GSM specification provides for authentication of mobile subscriber identities, there is no authentication of network entities defined in GSM. Some restriction policies exist, but there is no mechanism for assuring that the identity information has not been manipulated.

There is a need for a method for transmitting certain confidential information through mobile communication networks protected from attacks performed by accessing the signalling network. User confidentiality can be attacked by accessing certain information included in signalling messages. This information relates mainly to the origin/destination of the calls and location of the subscriber. Other attacks to the network operation may occur by impersonating a network node or network entity. The main threats faced from subscriber impersonation are the manipulation of answers to authentication procedures and the eavesdropping of authentication information. Such impersonation permits access to confidential information and may even result in a change to specific service behavior (e.g., Customized Applications for Mobile Network Enhanced Logic (CAMEL) charge services, location services, Supplementary Services (SS) procedures, redundancy, etc.), which may result in fraud and/or affect the network behavior.

The service availability can be compromised at the user level, based on manipulation of subscription information or messages granting the service. The service availability can also be compromised at the network level, by deletion of resource liberation related messages, e.g., deletion of a message indicating a subscriber's location, or by overloading the network through message injection.

There is thus a need for authenticating an originating node or network entity in order to initiate confidential communications between entities in one or more networks.

SUMMARY

It is therefore an object of the present invention to provide a technique for secure communication. It is yet another object of the present invention to provide a technique for authenticating network entities for confidential communications.

According to an exemplary embodiment of the present invention, these and other objects are met by a method and apparatus for secure communication between entities in one or more networks. A determination is made whether security measures needed for the communication exist between the entities. If such measures do not exist, the security measures are established, and the communication is initiated. The security measures include security bindings including information needed for the secure communication. Security measures are established between entities in one or more networks based on predetermined security requirements and on a determined needed security level. The security level needed may be determined based on whether the entities are in the same network or in different networks and/or on the information being transmitted. Security bindings are established between the entities depending on the information to be transmitted and/or the network to which the entities belong. The security bindings include information identifying the security binding, encryption information, authentication information, integrity information, a list of addresses or group of addressees included in the security bindings, and/or information regarding the lifetime of the security bindings. The encryption, authentication, and integrity may be specified at a parameter level.

BRIEF DESCRIPTION OF THE DRAWINGS

The features, objects, and advantages of the invention will become apparent by reading this description in conjunction with the accompanying drawings, in which like reference numerals refer to like elements and in which.

DETAILED DESCRIPTION

A general premise of any security analysis is that the weakest point in the security chain may compromise the complete security system. In a signalling system, the chain comprises a number of signalling protocols, such as Integrated Services Digital Network (ISDN) User Part (ISUP), Data Transfer Application Part (DTAP), Base Station System Application Part (BSSAP), GPRS Transfer Protocol (GTP), CAMEL Application Part (CAP), Intelligent Network Application Protocol (INAP), etc. For illustrative purposes, the following discussion is directed towards the Translation Capability Application Part (TCAP) and Mobile Application Part (MAP) protocols. However, it will be appreciated that the invention is not limited to applications using these protocols, but may be applicable to other protocols.

According to an exemplary embodiment, security may be managed using one or more of four mechanisms: data encryption, authentication, integrity, and key management. Data encryption is used to assure confidentiality of transmitted information, authentication is used to assure that the messages received from a certain entity have not been injected or replayed by intruders, integrity is used to assure that the information has not been manipulated, and key management is used to manage the encryption, authentication, and integrity mechanisms. The key management mechanism allows flexible handling of keys upon which the encryption and authentication mechanisms are based.

There are various considerations to be taken into account when considering how to apply these mechanisms. For example, backward compatibility when communicating with entities not supporting the signalling security mechanism should be maintained. Also, forward compatibility should be made possible, allowing adaptation to further needs and emerging technologies (e.g., new encryption algorithms, future transmission of sensitive information, etc.). The impact of the security mechanisms on network performance should be minimized. The number of entities in the network with high security requirements should also be minimized. Handling of roaming scenarios should be made simple. High granularity in the application of the security mechanisms at the network, entity, procedure and subscriber levels should be provided, such that different security levels can coexist.

According to exemplary embodiments, all of the mechanisms do not have to be applied. For example, if the information contained in a message is considered important by itself, this implies that in some cases it may be desirable only to apply data encryption (to avoid eavesdropping) or only to apply data integrity (to avoid manipulation), independently of the other requirements. Thus, according to exemplary embodiments, the mechanisms are as independent as possible in order to allow the independent application of the mechanisms and to simplify the adaptation of the mechanisms to emerging technologies.

According to an exemplary embodiment, a key management system is proposed, and the encryption and authentication mechanisms take advantage of it in order to simplify the complete procedure. Since key management is commonly used by the other mechanisms, the key management mechanism will be described first.

Key Management

Key management is the administration and use of the services of generation, registration, certification, de-registration, distribution, installation, storage, archiving, revocation, derivation and destruction of keying material. The objective of key management is the secure administration and use of these key management services.

The protection of keys is extremely important. The appropriate protection of keys depends on the threats they face.

Problems that arise in key distribution are the number of entities involved in the communication and the nature of them. Since mobile networks such as the GSM/UMTS network allow roaming, there is communication between several entities out of the operator security domain. On the other hand, each operator may need to have complete control over the security in the entities.

Security bindings between entities indicate the allowed communication between entities and the characteristics of the encryption, authentication, and integrity mechanisms used and specific characteristics of the corresponding binding. According to an exemplary embodiment, the security bindings include information such as a binding identity, which uniquely identifies the security binding, encryption, which specifies the parameters to be encrypted, the algorithms applicable (e.g., BEANO) and the session key used, authentication, which refers to messaging requiring authentication, the authentication system applicable and the key used, integrity, which refers to messages requiring integrity and the integrity system applicable, lifetime, which is the time during which the security binding is considered applicable, and destinations, which includes a list of addresses or group of addresses (e.g., MSISDN series) included in the security binding.

Using a common Signalling System between entities will originate a huge amount of possible messages using a certain key, which allow attacks based on massive information. This can be avoided by the use of very strong authentication mechanisms which usually are based on large keys and block sizes, implying an undesirable impact in the system performance.

The problem of attacks based on massive information can be avoided by frequent key changes. Thus, according to an exemplary embodiment, session keys, which only remain valid for a particular communication session, may be used.

Figure 3:
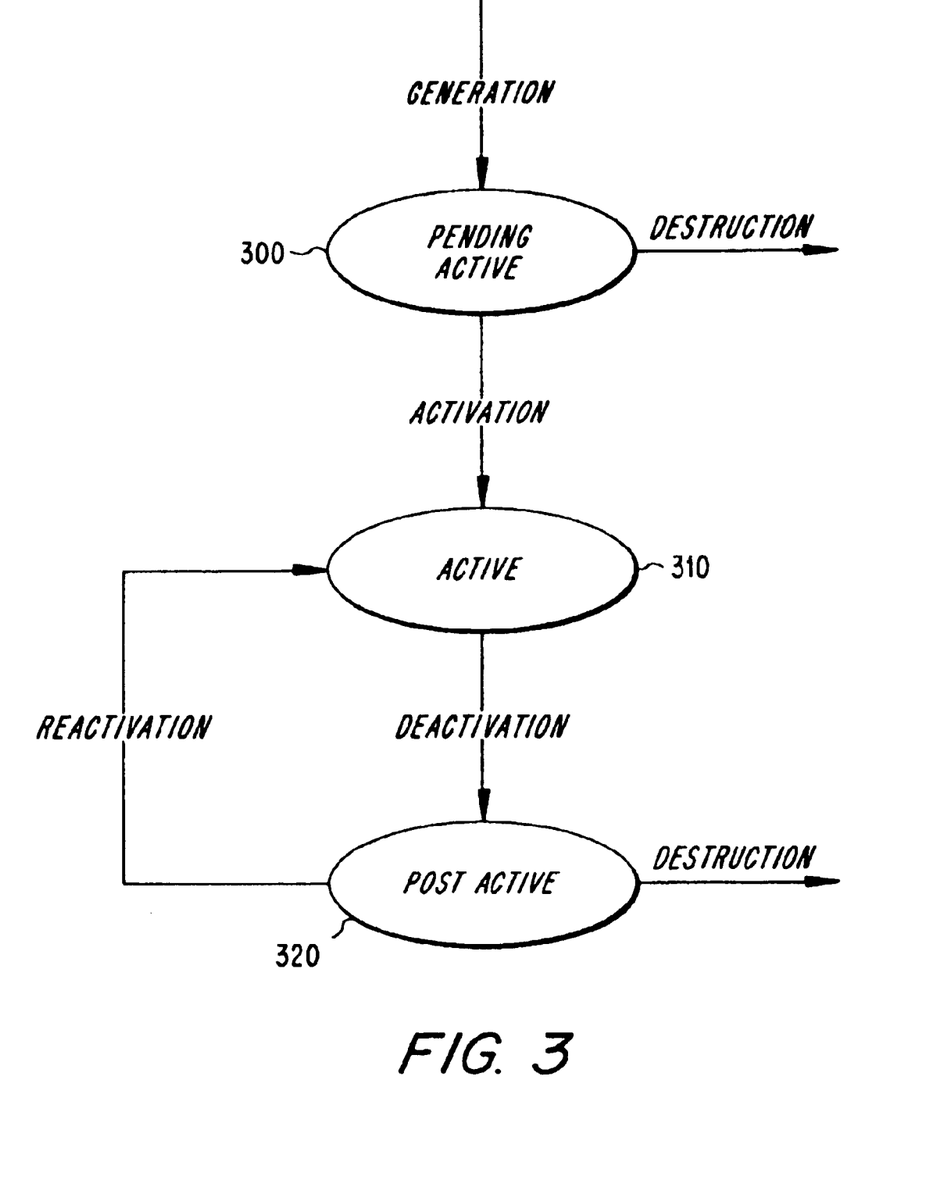
FIG. 3 illustrates a key life cycle.

A session key is only made valid during a prescribed period. Thus, the keys are temporary and subject to modification after the prescribed period. A life cycle is therefore associated with each key. A typical life cycle of a key is illustrated in FIG. 3.

The life cycle includes three principal states: pending active, active, and post active. When a key is generated, it enters the pending active state 300. In the pending active state 300, a key has been generated, but has not been activated for use. The key remains in the pending active state until it is either destroyed or activated for cryptographic operations. Upon activation, the key enters the active state 310. In the active state 310, the key is used to process information cryptographically. The key remains in the active state until it is deactivated, which limits a key's use, e.g., because the key has expired or has been revoked. Upon deactivation, the key has limited use and enters the post active state 320. In the post active state 320, the key is only used for decipherment or verification. The key remains in the post active state until it is either destroyed or is reactivated. Reactivation allows a post-active key to be used again for cryptographic operations, at which point it returns to the active state 310.

The number of entities exponentially increases the need for security bindings between cooperating entities. If the security bindings between the entities are independent for each communicating pair, this will negatively impact processing and performance. But, if the same key is shared in several security bindings, the probability of breaking it increases, which may result in a breakdown of the entire security system.

To address this problem, the number of entities that shall be authenticated by parties outside the operator security domain should be minimized. Therefore, according to exemplary embodiment, only a few entities in each network are authenticated by Trusted Third Party (TTP) systems.

According to an exemplary embodiment, the functionality of key handling in the operator domain may be based on an existing Authentication Center (AuC). The AuC contains information for authenticating subscribers at the attachment phase to the network of the mobile terminals, e.g., when the subscribers switch on the mobile terminals, and the mobile attach to the network. This is advantageous because the AuC already has strong security requirements that may be used for this application. In addition, in the GSM system, AuC's handle MAP protocol that can be easily used for communicating entities such as a VLR, MSC, and HLR, etc., to handle key distribution.

Figure 4:
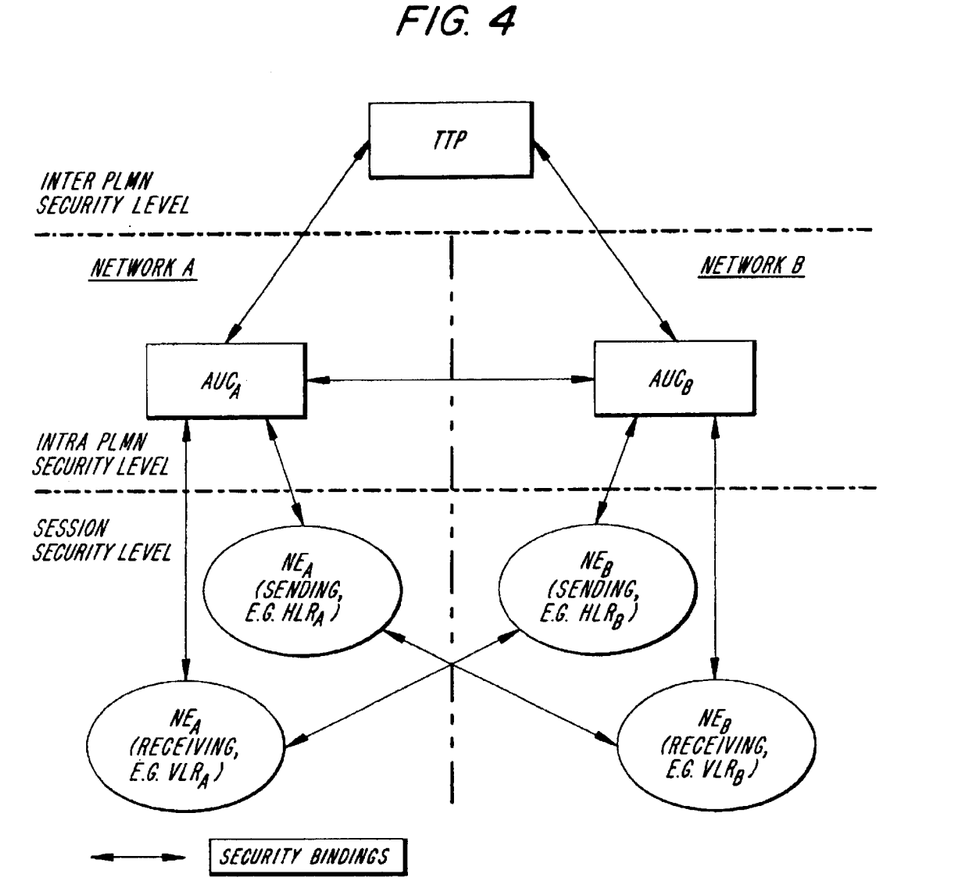
FIG. 4 illustrates a system for secure communication according to an exemplary embodiment.

An exemplary basic key management architecture showing the security bindings between network entities is shown in FIG. 4. There are three different security levels: Inter PLMN level, Intra PLMN level, and Session level.

The Inter PLMN level is used for establishing security bindings between entities belonging to different PLMNs. For example, as shown in FIG. 4, security bindings are established between the TTP and the $AuC_A$ of Network A, and between the TTP and the $AuC_B$ of Network B. These security bindings are established based on predetermined security requirements, e.g., based on either bilateral agreements between PLMN operators or by trusting in an external co-operation or entity acting as a TTP, i.e., an entity used to authenticate other entities. These security bindings have strong security requirements and the specific mechanism used should be enough flexible to allow state of the art techniques. The TTP may be integrated with other systems outside the network. Nevertheless, a default mechanism should be supported to provide this security bindings in a multivendor environment.

According to an exemplary embodiment, the Intra PLMN level is used for establishing security bindings between entities belonging to the same PLMN. At the Intra PLMN level, one or more AuC entities (with security bindings established) act as a TTP for the entities in the PLMN. For example, as shown in FIG. 4, a security binding exists between $AuC_A$ and $AuC_B$. These security bindings may be established at the operator premises, to allow the establishment of different standard and customized security schemes. Nevertheless, some standard mechanisms should be supported to provide the security bindings in a multivendor environment.

The Session level is used for establishing security bindings between communicating entities. The session established will be handled through the AuC (or AuCs) assigned to the entities. Each entity trusts in its corresponding AuC. For example, as shown in FIG. 4, Network Entities in Network A, $NE_A$, are connected to the $AuC_A$ via security bindings. Similarly, Network Entities in Network B, $NE_B$, are connected to $AuC_B$ by security bindings. Also, the Network Entities $NE_A$ and $NE_B$ are connected to each other via security bindings. Although one AuC is shown for each network in FIG. 4 for simplicity of illustration, it will be appreciated that more than one AuC may be employed in each network and that more than one AuC may be assigned to each entity in the network.

At the Session level, there are two types of communication possible, depending on the type of communication (Inter PLMN or Intra PLMN). If the communication is Inter PLMN, i.e., between entities in different networks, the selected identification mechanism should allow the establishment of different standard security schemas. If the communication is Intra PLMN, i.e., between entities within the same network, the selected mechanism should allow the establishment of different standard and customized security schemas. Nevertheless, some standard mechanisms should be supported to provide the security bindings in a multivendor environment.

So, the selected mechanism should allow the establishment of different standard and customized security schemas. According to an exemplary embodiment, the security bindings may be based in MAP protocol.

As a consequence of installation, each entity will have enough information to contact the AuC responsible for its signal security. Security bindings to different levels will be established, first to the Intra HPLMN level and then to the Session level.

Figure 5A:
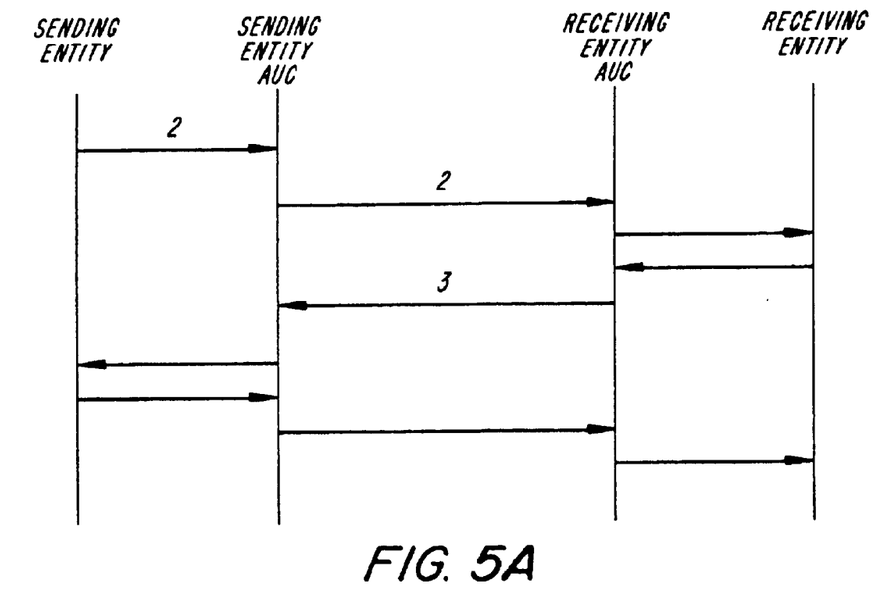
FIG. 5A illustrates a message sequence for the transmission of key management information.

The sequence shown in FIG. 5A illustrates an exemplary message flow for transmission of key handling information. First, the Sending Entity checks whether the security binding has been established with the Receiving Entity or whether the security binding has expired. Next, the Sending Entity sends a Security Binding Request message to the Sending Entity AuC. The Sending Entity AuC maintains information about the desired security bindings for the Sending Entity, indicating for each attribute whether the attribute is requested or negotiable. The Sending Entity AuC sends a Security Binding Request message to the Receiving Entity AuC. The Receiving Entity AuC sends a message to the Receiving Entity, and the Receiving Entity determines which attributes it can handle and responds to the Receiving Entity AuC with the accepted security binding attributes. The Receiving Entity AuC then responds to the Sending Entity AuC with the accepted attributes. The Sending entity AuC sends a Security Binding Acceptance message to the Sending Entity, indicating acceptance of the attributes specified by the Receiving Entity. If the accepted attributes are considered sufficient for the communication, the Sending Entity responds to the Sending Entity AuC with a Security Binding Acceptance acknowledgment message, and this message is forwarded to the Receiving Entity via the Receiving Entity AuC.

As an alternative, the Receiving Entity AuC can determine which attributes are acceptable and send a Security Binding Notification Message to the Sending Entity AuC and the Receiving Entity indicating the acceptable attributes. This alternative may be acceptable, e.g., when the Receiving Entity AuC has information specifying which attributes the Receiving Entity can handle.

According to an exemplary embodiment, the key handling messages are sent encrypted and authenticated, with integrity information included.

Figure 5B:
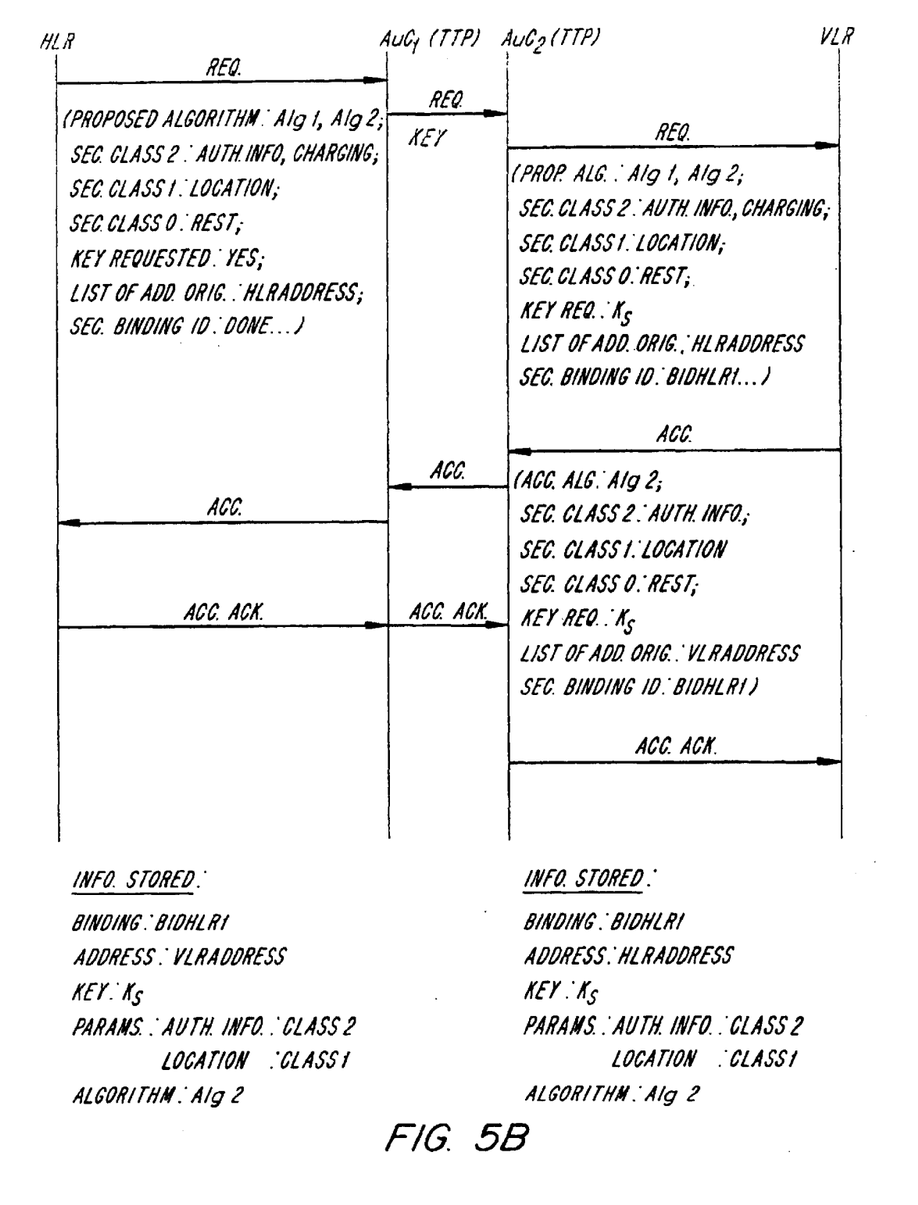
FIG. 5B illustrates a detailed example of a process for establishing a security binding.

FIG. 5B illustrates a detailed example of a process for establishing a security binding. In this figure, a method for establishing a security binding between an HLR and a VLR is shown as an example. The method begins with the HLR initiating a request to establish a security binding to the VLR. The request includes proposed algorithms, e.g., Alg 1 and Alg 2, and the level of security for the parameters, e.g., class 2 for authentication information and charging data, class 1 for location, and class 0 for the remainder of the data. The HLR address is also included. Since the security binding has not been established yet, there is no security binding identity included. The request is received by the AuC for the HLR, $AuC_1$, and transmitted to the AuC for the VLR, $AuC_2$. $AuC_2$ transmits the request to the VLR, includes a key request and assigns a security binding identity. The VLR determines which of the proposed algorithms and security classes it can handle and replies with an appropriate message, e.g., an acceptance message that indicates acceptance of Alg 2 and acceptance of the security classes. The acceptance message also provides the VLR address. The acceptance message is forwarded from $AuC_2$ to $AuC_1$, and $AuC_1$ transmits the acceptance message to the HLR. The HLR replies with an acceptance acknowledgment, which is transmitted to $AuC_1$. $AuC_1$ forwards this message to $AuC_2$, and $AuC_2$ transmits this message to the VLR. After the acceptance acknowledgment is received but he VLR, the security binding establishment is completed.

Data Encryption

There are many types of confidential information that may be transmitted between network entities, e.g., location information, charging information and triplets, i.e., information elements used to authenticate subscribers, including random, figured response, and ciphering key. For example, this information can be identified in MAP and Capability Application Part (CAP) protocols in the following messages:

TABLE I

Location Information

| Parameter | Message | Protocols |
| --- | --- | --- |
| RESULT Parameter:LocationInformation | ProvideSubscriberInfo (HLR->MSC/VLR) | MAP V1, V2, REL96, REL97 |
| RESULT Parameter:LocationInformation | SendRoutingInfo (HLR->GMSC) | MAP REL96, REL97 |
| RESULT Parameter:LocationInformation | Anytime interrogation (gsmscf->HLR) | MAP REL96 |
| ARGUMENT Parameter:LocationNumber | Initial DP (gsmssf->gsmscf) | CAP |

TABLE II

Charging Information

| Parameter | Message | Protocols |
| --- | --- | --- |
| Result parameter PartyToChange | FurnishChargingInfo (SRR->SSP) | CAP REL97 |
| RESULT Parameter FreeFomatData | FurnishChargingInfo (SCP->SSP) | CAP REL97 |

TABLE III

Triplets

| Parameter | Message | Protocols |
| --- | --- | --- |
| RESULT Parameter: Authentication set | SendAuthenticationInfo (MSC/VLR -> HLR, VLRa -> VLRb) | MAP V1, V2, REL96, REL97 |

A consequence of the examples above is that the parameters are not present in all the messages and that usually they are only a small part of the complete message requesting confidentiality. Another consideration is that the information used for addressing purposes (e.g., at the Signalling Connection Control Part (SCCP)) can be accessed at lower levels than MAP or CAP protocols (e.g., International Mobile Subscriber Identity (IMSI), Mobile Services Integrated Services Digital Network (MSISDN), VLR number, etc.). As a consequence, the security chain for this information is vulnerable, and it does not make sense to protect it at an Application Part level.

Therefore, according to an exemplary embodiment, confidential information is encrypted at the parameter level, removing these parameters from the ClearText part and including them in a new Encrypted part of the MAP operation, e.g.:

Param__1, Param__2, Param__3, Param__4
   If Param__2 and Param__4 are confidential
   ClearText(Param__1, Param__3), Encrypted(Param__2, Param__4)

Figure 6:
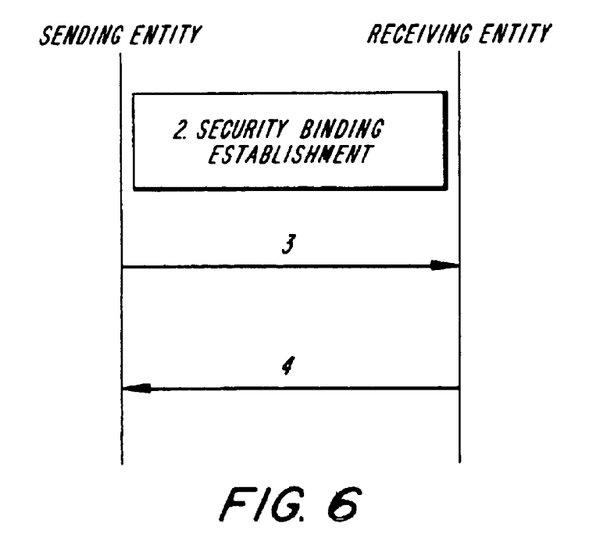
FIG. 6 illustrates a message sequence for the transmission of encrypted information.

The sequence shown in FIG. 6 illustrates an exemplary message flow corresponding to the transmission of encrypted parameters. As shown in FIG. 6, the Sending Entity checks whether the security binding has been established with the Receiving Entity or whether the security binding has expired. If the security binding has not been established, or the lifetime has expired, the security binding is established, e.g., using the process shown in FIG. 5A. Next, a message with the information is sent; The confidential parameters (identified by the security binding) are encrypted in the Sending Entity. Then, the message with encrypted information is answered. The confidential parameters (identified by the security binding) are encrypted in the Receiving Entity.

The encrypted information can be included in a new standard parameter (e.g., encrypted information), the content of which is completely encrypted (except tag and length). The encrypted information may comprise a set of standard and proprietary parameters including information considered sensitive which should not be transmitted following the normal coding. The content of this encrypted information parameter can be defined either on a message basis or as a common data type that can be used in all applicable operations including, as an option, all possible parameters that could contain sensitive information. This parameter can contain authentication information, integrity information, padding octets and all other information requested by the selected security mechanism.

Figure 7:
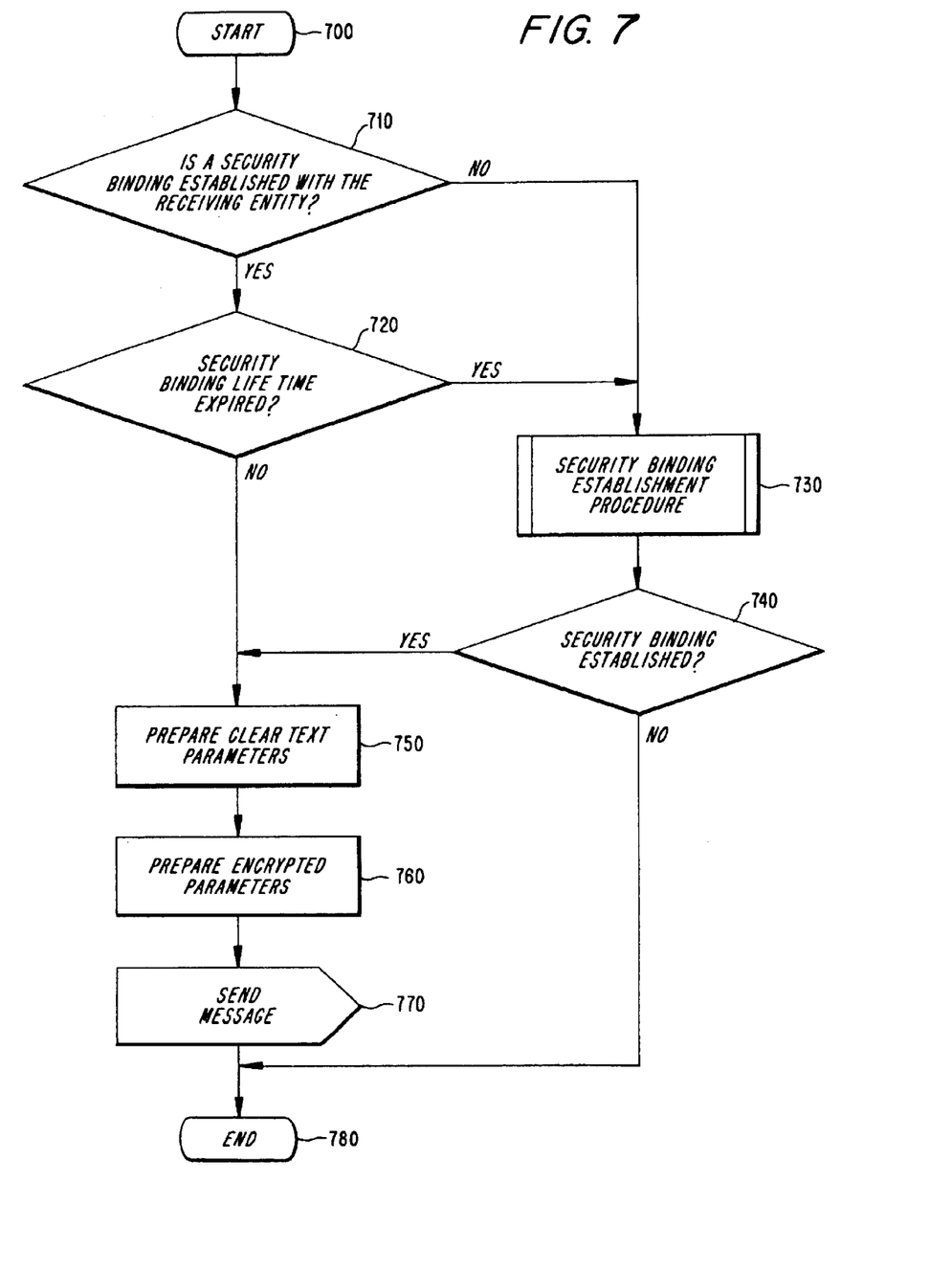
FIG. 7 illustrates an entity procedure for transmitting encrypted information.

The selection of encrypted information may be performed in the sending entity according to the established security binding. FIG. 7 shows an exemplary entity procedure for selecting encrypted information. The process begins at step 700. At step 710, a determination is made whether a security binding has been established with the Receiving Entity. If so, a determination is made whether the security binding lifetime has expired at step 720. If, at step 710, it is determined that the security binding has not been established with the Receiving Entity or at step 720 it is determined that the security binding lifetime has expired, a security binding establishment procedure such as that shown in FIG. 5A is performed at step 730. Then, a determination is made whether the security binding is established at step 740. If it is determined that the security binding is not established at step 740, the process ends at step 780.

From a determination at step 790 that the security binding lifetime has not expired or a determination at step 740 that the security binding has been established, the method proceeds to step 750 at which clear text parameters are prepared. At step 760, encrypted parameters are prepared. At step 770, the message is sent, and at step 780, the process ends.

Entity Authentication

Some operations may cause undesired behavior in the network when injected by impersonating trusted entities. In principle, all operations may be used for illegal purposes. Some examples are given in Table IV:

TABLE IV

| Message | Effect | Protocols |
|---|---|---|
| Update location (VLR->HLR) | Allow originating services to unregistered subscribers | MAP |
| ProvideSubscriberInfo (HLR->MSC/VLR) | Allow unallowed terminating calls | MAP |
| InsertSubscriberData (HLR->VLR) | Allow services not provided to the subscriber Allow arming CAMEL TAPS | MAP |
| InterrogateSS (HLR->VLR) | Request subscriber information | MAP |
| Anytime interrogation (gsmscf->HLR) | Request subscriber information | MAP |
| Initial DP (gsmssf->gsmscf) | Its interception allows overcome possible controls | CAP |

As can been seen from the examples above, different messages may affect network behavior differently. Thus, as a consequence, not all entities have the same authentication requirements. Also, depending on the operation, the sending or receiving entity may request authentication (e.g., in a Location Updating (LU) operation, the receiving may request authentication, while in an Insert Subscriber Data (ISD) operation, the sending entity may request authentication, etc.). Another consideration, as noted above with regard to encryption, is that the information used for addressing purposes (e.g., at the SCCP) can be accessed at lower levels than MAP or CAP protocols (e.g., IMS1. MSISDN, VLR number, etc.) and changed. As a consequence, is does not make sense to protect this information at an Application Part level.

According to an exemplary embodiment, entity authentication is applied on a per entity basis, only to selected operations. A new Authenticator parameter may be included in the new Encrypted part of the MAP operations, e.g.:

Param__1, Param__2
   If the sending entity is to be authenticated:
   ClearText(Param__1, Param__2), Encrypted (Authenticator)

There are various types of authentication used between entities.

For example, in type 1 authentication, the sending entity uses the key for the domain so the confidentiality and authenticity will be based on the security of the keys. This allows implicit authentication. Explicit authentication can be done if digital signatures are included in the messages as new parameters.

In type 2 authentication, explicit authentication is possible when key exchange is initiated. When the key agreement is established, the certificate can be provided from the TTP to the sending entity. This allows the sending entity to send the certificate to the receiving entity. Assuming the key is secure, during the active period of the key, only the sending entity will be able to send encrypted information to receiving entity using that session key. A certificate in this case may be Kn2[Ksn1n2, ID(N1),T,LKsn1n2]. Assuming the key is secure during the active period of the key, implicit authentication occurs.

When data is transferred, explicit authentication is possible as well, for example using digital signatures. For example, the message will generate a message digest using a hash function and then apply a digital algorithm to the digest.

Type 3 authentication is the same as type 2 authentication, and a certificate in this case may be eKsn2[eKpn2[Ksn1n2, D(N1), T, Lks]//TVP]). Explicit signature is possible, as well.

Figure 8:
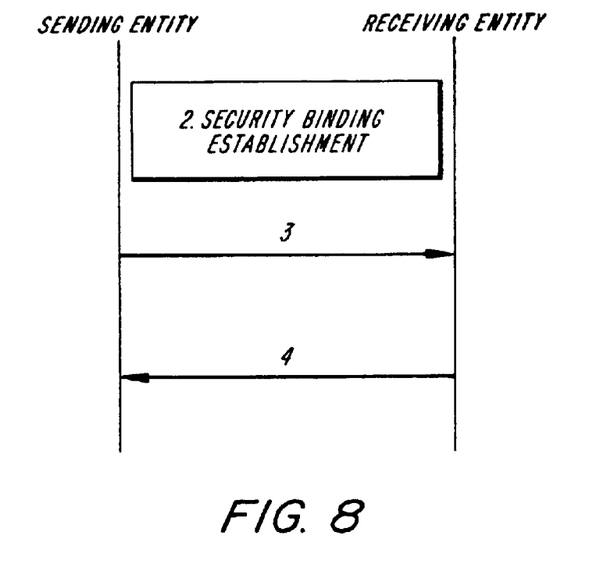
FIG. 8 illustrates a message sequence for the transmission of authentication information.

The sequence shown in FIG. 8 illustrates the message flow for the transmission of authentication information. First, the Sending Entity checks whether the security binding has been established with the receiving entity or if it has expired. If the security binding has not been established, or the lifetime has expired, the security binding is established, e.g., using the process shown in FIG. 5A. Next, a message with Authentication information is sent. Then, the Authentication parameter (identified by the security binding) is encrypted in the Sending Entity. A Message with Authentication information is answered. The Authentication parameter (identified by the security binding) is encrypted in the Receiving Entity.

The Authentication Information can be included in a new standard parameter (e.g., entity Authenticationinformation) into the encrypted Information parameter described above. The Authentication Information may be included in a container including the digital signature according to the security binding established between the communicating entities.

Although not shown, an entity procedure similar to that shown in FIG. 7 may be performed for transmission of authentication information.

Data Integrity

According to an exemplary embodiment, the integrity of the information is assured by including Integrity Information in the Encrypted part of the MAP operation calculated based in the message content and other potential information (e.g. TVP, time stamp, sequence number, etc.), e.g.:

Param__1, Param__2

If the message integrity is to be assured:

ClearText(Param__1, Param__2), Encrypted(Integrity)

Figure 9:
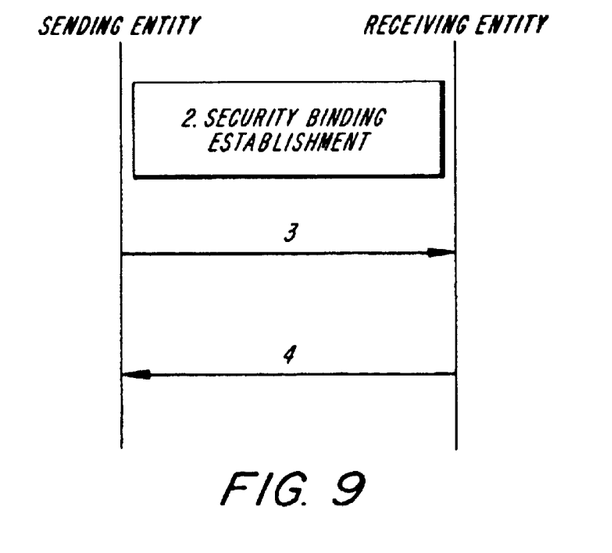
FIG. 9 illustrates a message sequence for the transmission of integrity information.

The sequence shown in FIG. 9 illustrates the message flow corresponding to the transmission of Integrity Information. First, the Sending Entity checks whether the security binding has been established with the receiving entity or if it has expired. If the security binding has not been established or the lifetime has expired, the security binding is established, e.g., using the process shown in FIG. 5A. Next, a Message with Integrity information is sent. The Integrity parameter (identified by the security binding) is calculated as a function of the message content and encrypted in the Sending Entity. Then, a Message with Integrity information is answered. The Integrity parameter (identified by the security binding) is encrypted in the Receiving Entity.

The integrity information can be included in a new standard parameter (e.g., integrity information) into the encrypted information parameter as described above.

Although not shown, an entity procedure similar to that shown in FIG. 7 may be performed for transmission of integrity information.

According to exemplary embodiments, mechanisms for authentication, encryption, integrity and key handling are provided for insuring secure communications. Operations from non-authenticated nodes can be restricted. Backward compatibility is maintained, and forward compatibility is assured. The transmission mechanism is independent of the key handling and ciphering method. The Overhead related to encryption/decryption is only added to security sensitive messages, parameters and notes.

Although described with reference to security management in a GSM system using CCITT No. 7 signalling and CAP and MAP protocols, it will be appreciated by those of ordinary skill in the art that this invention can be embodied in other specific forms without departing from its essential character. For example, the principle of security management described above may be applicable to other types of signalling protocols and/or other types of communication systems. The embodiments described above should therefore be considered in all respects to be illustrative and not restrictive.

We claim:

1. A method for establishing security bindings between a sending network entity and a receiving network entity, the method comprising:

sending, by the sending network entity, a first security binding request to a first authentication entity wherein the first security binding request includes requested security binding parameters;

determining, by the first authentication entity, proposed security bindings parameters for the sending network entity;

sending, by the first authentication entity, a second security binding request to a second authentication entity, wherein the security binding request includes identification information for the receiving network entity and proposed security binding parameters;

determining, by the second authentication entity, whether the proposed security binding parameters are applicable to the receiving network entity;

sending, by the second authentication entity, to the first authentication entity an indication of which proposed security binding parameters are acceptable;

sending, by the first authentication entity, a response to the sending network entity indicating the accepted security binding parameters; and determining, by the sending network entity, whether the accepted security binding parameters are sufficient, if yes, then sending an security binding acceptance indication to the receiving network entity via the first authentication entity and the second authentication entity.

2. The method of claim 1, wherein the determining whether the proposed security bindings are applicable further comprises sending a third security binding request to the receiving network entity and receiving an acknowledgement from the receiving network entity.

3. The method of claim 1, wherein the second security binding request includes parameters which are selected from the group consisting of proposed security algorithms, security levels, and data class information.

4. The method of claim 2, wherein the third security binding request includes parameters which are selected from the group consisting of key request information and security binding identity information.

5. The method of claim 1, further comprising encrypting the security binding parameters.

6. The method of claim 5, wherein the encrypting is specified at a parameter level.

7. The method of claim 1, further comprising requesting entity authentication by either the sending network entity or the receiving network entity.

8. The method of claim 7, wherein the entity authentication is specified at a parameter level.

9. The method of claim 7, wherein the entity authentication is applied on a per entity basis only to selected operations.

10. The method of claim 1, wherein the security binding parameters includes integrity information.

11. The method of claim 1, wherein the determining proposed security bindings parameters for the sending network entity includes determining a security level needed for the communication based on predetermined security requirements.

12. The method of claim 11, wherein the determining a security level depends on the information to be transmitted.

13. The method of claim 11, wherein the determining a security level depends on the network to which either the receiving or sending network entity belongs.

14. A system for establishing security bindings between a sending network entity and a receiving network entity, the system comprising:
- a means for sending, by the sending network entity, a first security binding request to a first authentication entity wherein the first security binding request includes requested security binding parameter;
- a means for determining, by the first authentication entity, proposed security bindings parameters for the sending network entity;
- a means for sending, by the first authentication entity, a second security binding request to a second authentication entity, wherein the security binding request includes identification information for the receiving network entity and proposed security binding parameters;
- a means for determining, by the second authentication entity, whether the proposed security binding parameters are applicable to the receiving network entity;
- a means for sending, by the second authentication entity, to the first authentication entity an indication of which proposed security binding parameters are acceptable;
- a means for sending, by the first authentication entity, a response to the sending network entity indicating the accepted security binding parameters; and
- a means for determining, by the sending network entity, whether the accepted security binding parameters are sufficient, if yes, then sending an security binding acceptance indication to the receiving network entity via the first authentication entity and the second authentication entity.

15. The system of claim 14, wherein the means for determining whether the proposed security bindings are applicable further comprises a means for sending a third security binding request to the receiving network entity and a means for receiving an acknowledgement from the receiving network entity.

16. The system of claim 14, wherein the second security binding request includes parameters which are selected from the group consisting of proposed security algorithms, security levels, and data class information.

17. The system of claim 15, wherein the third security binding request includes parameters which are selected from the group consisting of key request information and security binding identity information.

18. The system of claim 14, further comprising a means for encrypting the security binding parameters.

19. The system of claim 18, wherein the encrypting is specified at a parameter level.

20. The system of claim 14, further comprising a means for requesting entity authentication by either the sending network entity or the receiving network entity.

21. The system of claim 20, wherein the entity authentication is specified at a parameter level.

22. The system of claim 20, wherein the entity authentication is applied on a per entity basis only to selected operations.

23. The system of claim 14, wherein the security binding parameters includes integrity information.

24. The system of claim 14, wherein the means for determining proposed security bindings parameters for the sending network entity includes a means for determining a security level needed for the communication based on predetermined security requirements.

25. The system of claim 24, wherein the means for determining a security level depends on the information to be transmitted.

26. The system of claim 24, wherein the means for determining a security level depends on the network to which either the receiving or sending network entity belongs.

* * * * *